Sept. 5, 1933. V. L. OESTNAES ET AL Re. 18,937

SIGNAL LIGHT REFLECTOR

Original Filed Aug. 30, 1929

Inventors.

Victor L. Oestnaes
Richard W. Luce

By Cyrus N. Anderson
Attorney

Reissued Sept. 5, 1933

Re. 18,937

UNITED STATES PATENT OFFICE 18,937

SIGNAL LIGHT REFLECTOR

Victor L. Oestnaes, Westfield, and Richard W. Luce, Mountainside, N. J., assignors to American Gasaccumulator Company, Elizabeth, N. J., a corporation of New Jersey Original No. 1,840,790, dated January 12, 1932, Serial No. 389,356, August 30, 1929. Application for reissue March 25, 1933. Serial No. 663,639

11 Claims. (Cl. 88—1)

Our invention relates to signal light reflectors and to means by which parts of signal reflector structure units may be united and held together and by which such units may be mounted upon and supported by a supporting means; and although the invention is illustrated as being embodied in a triple reflector unit of hollow type it is to be understood that, with respect to certain features thereof, it may be embodied in reflector units of other character and structure.

In reflectors of the character illustrated it is the usual practice to provide a cover plate of glass which overlies the open side of the reflector, and it is an object of the invention to provide a device for uniting the cover plate with the reflector and holding the same in united cooperative relation therewith, and also to provide the said device with means whereby the reflector may be mounted upon and supported by a support therefor.

It also is an object of the invention to provide a light reflector unit with a member surrounding the edge of the said reflector and having projections thereon which are adapted to be placed in engagement with a supporting member by which the said reflector may be held and supported in any position desired in use.

Another object of the invention is to provide a reflector of novel construction including means whereby devices for fastening a cover plate thereon and for fastening said reflector to a supporting means may be secured readily thereon.

To the foregoing and other ends the invention comprehends the construction and arrangement of parts as hereinafter described in detail, particularly pointed out in the claims and as illustrated in the accompanying drawing wherein is illustrated an embodiment thereof in the form which at present is preferred by us. However, it will be understood that the invention is susceptible of embodiment in other forms of construction than that shown and that changes in the details of construction may be made within the scope of the claims without departing from the invention.

Figure 1:
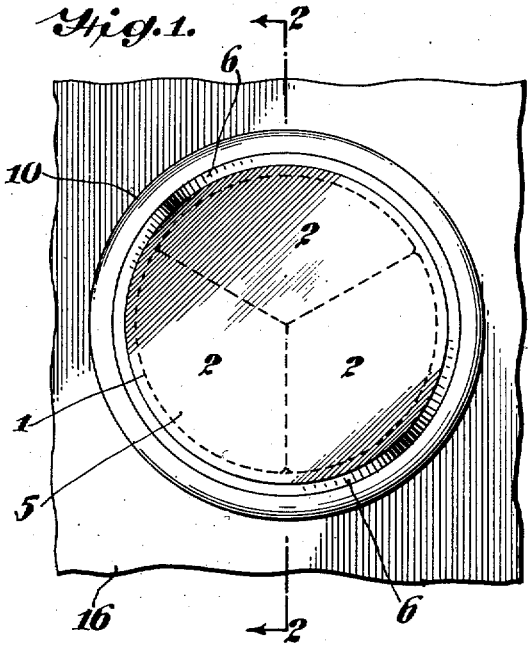
Fig. 1 is a view in front elevation of a light signal reflector constructed in accordance with the invention and also showing a fragmentary portion of a support for the reflector.
Figure 2:
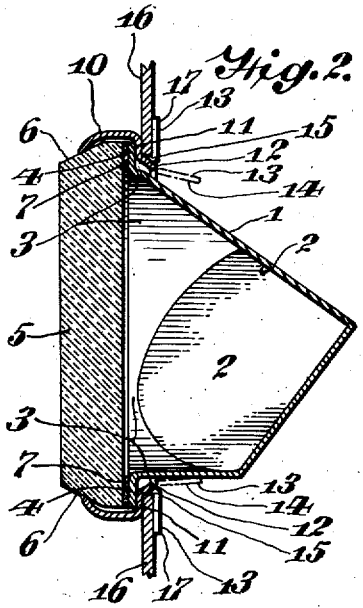
Fig. 2 is a transverse sectional view taken on the line 2—2 of Fig. 1.

Referring to the drawing, it will be noted that we have illustrated a triple light reflector 1 preferably constructed of sheet metal pressed or otherwise formed into the shape indicated to provide three plane portions 2 the inner surfaces of which are light-reflecting. Preferably the reflecting surfaces upon the plane portions 2 should be arranged in right angular relation to each other so as to form what is known as a central triple reflector. Instead of employing reflectors of triple type as illustrated it will be understood that reflectors of other character may be employed, and also that instead of the reflectors being hollow as illustrated they may consist of solid tetrahedral bodies of glass, as is known. The portions 2 and the light-reflecting surfaces thereon of the reflector unit 1 are arranged about an axis which extends centrally of the structure. The said portions 2 terminate and merge into a cylindrical portion 3 of the reflector unit, which is concentric with the axial line of the said reflecting surfaces. The cylindrical portion comprises narrow and elongated angular portions, as indicated in the drawing, the apices of the said angular portion corresponding to the points of meeting of the top edges of adjoining reflecting surfaces. The cylindrical portion 3 of the reflector unit 1 is provided with a laterally and outwardly extending circular flange 4. The reflector is provided with a cover plate 5 which consists of glass or any other suitable transparent or semi-transparent material. The said cover plate may be clear, or it may be colored, or the colored effect may be obtained by placing upon either the inner or the outer surfaces thereof or upon both surfaces a coating of some colored material through which light will pass. It will be noted that the outer portion of the periphery of the plate is beveled forwardly, as indicated at 6. The cover plate rests upon an annular washer 7 which is seated against the outer or front side of the lateral flange 4 to which reference has been made previously. The washer 7 should consist of material such as rubber, felt or the like, which will serve as a cushioning means between the frangible cover plate 5 and the flange 4 of the reflector 1. For the purpose of holding the cover plate 5 in position upon the flange 4 at the outer edge of the reflector 1 we have provided a holding ring 10, preferably of sheet metal, which in cross section is of a shape substantially as shown in Fig. 2 of the drawing. The inner side of the front edge of the ring engages or contacts with the beveled portion 6 of the cover plate 5, while the rear inwardly extending edge portion 11 engages with the under or rear side of the flange 4. The portion 11 of the ring 10 extends very nearly at right angles to the plane of the intermediate portion thereof, so that it readily overlies and contacts with the rear side of the flange 4. The presence of the cylindrical portion 3 at the front edge of the reflector unit 1 permits the part 10 to be of circular form, which simplifies and reduces the cost of manufacture thereof and of the reflector structure as a whole.

Figure 3:
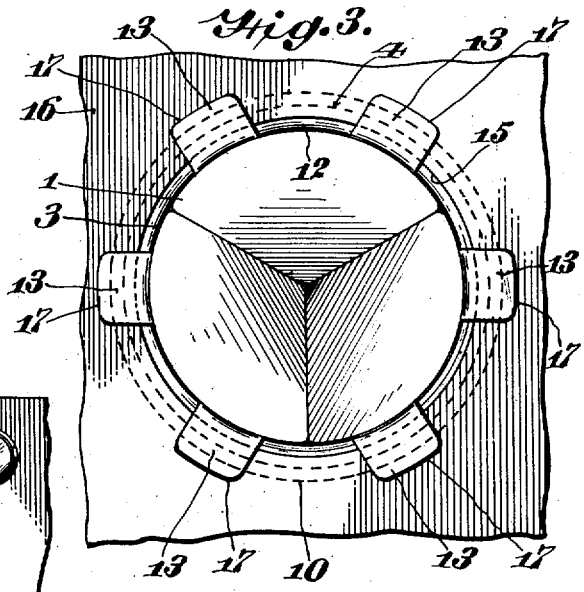
Fig. 3 is a view in rear elevation of the structure shown in Figs. 1 and 2.

In the operation of placing the ring 10 in position encompassing the flange 4 and the periphery of the cover plate 5 the outer edge portion of the said ring in the first instance extends in a direction substantially at right angles to the plane of the inwardly extending flange-like portion 11 and of the cover plate 5. After the parts have been placed in the position as shown in Fig. 2, with the flange 4 and the periphery of the cover plate 5 in position upon the inner side of the ring 10, the outer or front edge of the latter is then spun or otherwise worked over into position against the beveled outer edge portion 6 of the cover plate 5 so that the latter will be retained thereby in the position shown. A narrow flange-like portion 12 extends rearwardly from the inner edge of the portion 11 and is provided at intervals with projections 13. These projections normally extend in the direction indicated by the dash and dot lines 14 so that the said reflector, the said projections, and the rearwardly extending flange 12 may be extended through an opening 15 which may be provided in a plate 16 of metal or other suitable sheet material. After the projections have been extended through an opening such as that indicated at 15 they may be bent laterally into the position as indicated at 17 in Figs. 2 and 3 of the drawing. In such position they engage the rear side of the plate 16 and retain the reflector in position thereon. The edge of the sheet 16 surrounding the opening 15 is located between the said projections when bent into the position as indicated in Figs. 2 and 3 and the adjoining portions of the inwardly extended shoulder-like portion 11 of the ring 10.

Figure 4:
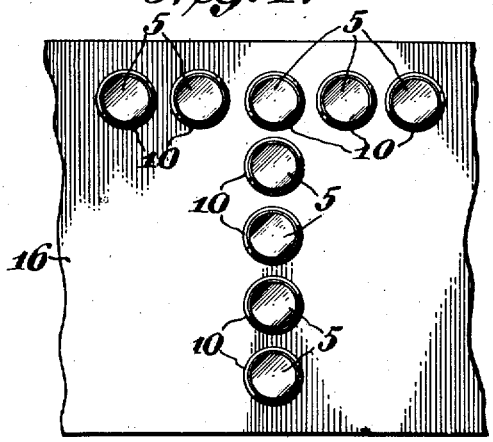
Fig. 4 is a view in front elevation showing a plurality of reflector units mounted upon a support in such relation to each other as to form a capital letter T.

These reflector units are adapted for use singly or they may be supported in groups in such relation to each other as to form letters, as is indicated in Fig. 4 of the drawing, wherein they are shown as being so related to each other as to form the capital letter T. It will be understood that they may be so related to each other as to form any other letter and that any number of letters may be formed in the necessary relation to each other to spell any word which may be selected.

It will be apparent that light reflector units of the character illustrated may be employed not only upon stationary supports for indicating a road or traffic condition or other information but also may be employed upon automobiles or other vehicles, particularly upon the rear ends thereof, so that the presence of such automobiles may be made known to those occupying other automobiles or like vehicles which may be approaching the same. Such approaching automobiles or other vehicles being provided with headlights, the rays of light from the said headlights passing through the cover plate 5 and impinging upon the light reflector surfaces 2 would be reflected back, in known manner, toward the occupants of such approaching automobiles or other vehicles.

Reflector units of the character indicated may be used in place or instead of the ordinary well known tail-lights for automobiles or may be used to supplement such lights, their presence being particularly desirable in case the usual or ordinary tail-light should become extinguished.

It will be seen that by our invention we have provided means which operates to hold the reflector 1 and the cover plate 5 together, and which also may be employed for effecting the mounting of the said reflector upon a support therefor.

Having thus described our invention, what we claim and desire to secure by Letters Patent is:

1. A light signal reflector structure, comprising a light-reflecting unit having reflecting surfaces arranged about a central axis, the said unit terminating at its front edge in an outwardly extending flange, a member of ring shape mounted upon the outer edge of the said reflector unit and embracing the said flange, the rear edge portion of said member being bent inwardly so as to engage the under side of the said flange, a support for the said structure, and projections provided upon the rear edge of said ring for engaging the said support whereby the said structure may be retained upon the said support and supported thereby.

2. A light signal reflector structure, comprising a hollow light-reflecting unit the front end portion of which is circular in cross section and is provided with a laterally and outwardly extending flange at its front edge, a cover plate mounted in front of the said reflector unit and resting upon the said flange, and means in embracing relation to the outer edges of the said flange and cover plate for holding the said cover plate and reflector unit in united relation to each other, the said means having projections which extend rearwardly from its rear edge for attaching the said unit to a support therefor.

3. A light reflector signal structure, comprising a hollow reflector unit, the front side of which terminates in a laterally and outwardly extending flange portion, a cover plate mounted over the front side of the said reflector and resting upon the said flange portion, means encircling the said flange and the periphery of the said cover plate and engaging the same to hold the cover plate in united relation to the said reflector unit, a support for the said reflector unit, and the rear edge of said encircling means being provided with rearwardly extending projections for connecting the said reflector unit with the said support.

4. A light reflector signal structure, comprising a hollow reflector unit terminating at its front end in a circular portion having a laterally and outwardly extending flange, a cover plate closing the open front end of the said reflector, a ring extending around the periphery of the said flange and of the said cover plate, the inner side of the said ring being concave and engaging the said flange and the said cover plate to hold the two in united relation to each other, and the said ring being provided with projections upon its rear edge.

5. A light signal reflector structure, comprising a hollow light reflector unit terminating at its front end in a circular portion having a laterally and outwardly extending flange, a cover plate of material of a character to permit light to pass therethrough mounted upon the said flange, a ring encircling the said flange and the periphery of the said cover plate and operating to hold the said cover plate in united relation to the said flange, the rear edge of the said ring being provided with projections located at intervals, and a support for the said structure, the said support comprising a sheet member having an opening therethrough into which said unit is inserted from the front toward the rear, and the said projections adapted to be extended rearwardly through said opening and bent around the edge thereof to retain the said structure in the said opening.

6. A light reflector signal structure, comprising a hollow light reflector unit terminating at its front end in a circular portion having a laterally and outwardly extending flange, a cover sheet of material through which light is permitted to pass which is seated against the said flange, means encircling the peripheries of the said sheet and of the said flange and engaging the said sheet and flange to retain the former in united relation with the latter, the said encircling means being provided with projections at intervals upon its rear edge, a support for the said structure comprising a metal plate having an opening extending therethrough of a diameter substantially equal to the circle in which the said projections are located, whereby the latter may be inserted rearwardly through said opening and bent laterally and outwardly over the edges of the said opening to retain the said unit upon the said supporting plate.

7. A sign structure comprising a glass element and a reflector element associated to form a reflecting unit, a supporting plate provided with an opening to receive the reflecting unit, an annulus clamping together the two elements of the reflecting unit and including a shoulder bearing against one face of the supporting plate, and means bearing against the opposite face of the plate and so related to the unit as to cooperate with the shoulder to secure the unit in the opening.

8. A sign structure comprising a reflecting unit including a glass element and a reflector in the rear thereof, a supporting plate provided with an opening to receive the reflecting unit, an annulus coaxially surrounding the reflecting unit and overlapping the glass element and the reflector in clamping relation therewith and including a circumferential shoulder bearing against one face of the supporting plate, and means bearing against the opposite face of the plate and so related to the unit as to cooperate with the shoulder to secure the unit in the opening.

9. A sign structure comprising a light reflecting unit including a front glass element and a metallic reflector element back of the glass element and having an outwardly flanged edge bearing against the rear face of the glass element, a supporting plate provided with an opening to receive the reflecting unit, a clamping member circumferentially surrounding the reflecting unit and marginally overlapping the glass and the reflector flange and clamping the two elements together, the clamping element having a shoulder bearing against the front face of the plate around the opening, and means bearing against the opposite face of the plate and so related to the unit as to cooperate with the shoulder to secure the unit in the opening.

10. A sign structure comprising a light reflecting unit including a front glass element and a metallic reflector element back of the glass element and having an outwardly flanged edge bearing against the rear face of the glass element, a clamping ring surrounding the juncture of the two elements of the reflecting unit and having its two edges turned inwardly to overlap the glass and the reflector flange and clamp the two elements together, and integral extensions on the rear edge of the clamping ring cooperative with the shoulder formed by the lower turned-in edge to provide a support attachment.

11. A sign structure comprising an autocollimating reflecting unit including a glass element, a reflector in the rear thereof and an annulus coaxially surrounding and holding the glass element and the reflector in fixed relation, a supporting plate provided with an opening to receive the reflecting unit, said annulus being axially disposed in the opening and including a circumferential shoulder bearing against the outer face of the supporting plate, and means carried by the unit bearing against the rear face of the plate and adjustable to exert rearward tension upon the unit and hold the said shoulder firmly against the front face of the plate.

VICTOR L. OESTNAES.
RICHARD W. LUCE.